US006257549B1

United States Patent
Hopper

(10) Patent No.: US 6,257,549 B1
(45) Date of Patent: Jul. 10, 2001

(54) ACTUATION MODULE

(75) Inventor: Hans Paul Hopper, Whiterashes (GB)

(73) Assignee: Cooper Cameron Corporation, Houston, TX (US)

( * ) Notice: Subject to any disclaimer, the term of this patent is extended or adjusted under 35 U.S.C. 154(b) by 0 days.

(21) Appl. No.: 09/384,004

(22) Filed: Aug. 26, 1999

(30) Foreign Application Priority Data

Sep. 3, 1998 (EP) .................................................. 98307106

(51) Int. Cl.⁷ .............................. E21B 34/16; F16K 31/04
(52) U.S. Cl. .............................. 251/129.11; 251/129.04; 166/363
(58) Field of Search ........................ 251/129.04, 129.11, 251/129.12, 129.13; 166/339, 363, 66.4

(56) References Cited

U.S. PATENT DOCUMENTS

| | | | |
|---|---|---|---|
| 4,337,829 | * 7/1982 | Banzoli et al. ................... | 166/363 X |
| 4,580,761 | * 4/1986 | Silcox et al. ..................... | 251/129.11 |
| 4,667,736 | * 5/1987 | Rumbaugh et al. ........ | 251/129.04 X |
| 4,886,114 | * 12/1989 | Perkins et al. ............... | 251/129.04 X |
| 4,920,811 | * 5/1990 | Hopper ........................................ | 74/2 |
| 5,166,677 | * 11/1992 | Schoenberg ....................... | 166/363 X |
| 5,195,721 | 3/1993 | Akkerman ............................. | 251/129 |
| 5,588,637 | * 12/1996 | Carsten et al. .............. | 251/129.13 X |
| 5,704,392 | * 1/1998 | Frew ........................... | 251/129.12 X |

* cited by examiner

Primary Examiner—Kevin Shaver
Assistant Examiner—Eric Keasel
(74) Attorney, Agent, or Firm—Michael P. Hartman; Peter J. Bielinski

(57) ABSTRACT

A rotary electric actuator module has a plurality of actuators for actuating a device in a subsea wellhead assembly. The module is arranged to receive primary power and control signals from an external source in order to actuate the subsea devices. Each actuator in the module has a back-up power supply, each power supply having a self-contained electrical storage unit providing a source of secondary power. Each actuator has a motor driven by the electrical storage unit. A control system is provided to detect the interruption of the primary power or the control signals and, if the subsea device is in an unsafe operating position, cause the subsea device to move into a safe position using the secondary power.

7 Claims, 3 Drawing Sheets

ACTUATION MODULE

BACKGROUND OF THE INVENTION

Field of the Invention

The present invention relates to a actuation module, and in particular to a valve actuation module for actuating valve elements, such as a gate valve slab, needle stem, ball valve sphere or a choke cage or plug, on a subsea wellhead, but can equally be applied to other devices that require operating in a subsea environment.

Currently perceived wisdom is that subsea wellheads should have hydraulically operated valves which are provided with a fail-safe mechanism in the form of a large spring arranged to push the valve element into a safe position upon loss of hydraulic pressure. Generally speaking, it is possible to use the well pressure to assist in this movement of the valve element. However, for safety reasons it is still necessary to have a spring which is large enough that it will close the valve without assistance from the well pressure or in the reverse situation where external pressure is higher than well pressure.

With the current trend to deeper water wells, there is an increase in hydrostatic pressure but a possible decrease in well pressure. Thus, the net pressure differential can work against fail safe forces on the stem to close the valve. In this situation, the spring must be designed to be large enough to overcome the friction between the valve elements, the housing seals, and to overcome the hydraulic forces to expel the hydraulic control fluid to close the valve against the hydrostatic pressure and low internal well pressure. It can be readily appreciated from this that at increasing water depths, the size of the spring must be greatly increased thereby increasing the size and cost of the system. Further, the size of the force delivered by the spring has an adverse effect on the high power required for each operation and on its sensitivity.

An alternative approach is disclosed, for example, in U.S. Pat. Nos. 4,920,811 and 5,195,721 in which the valve elements are electrically operated by powerful electrical motors using considerable electrical power. This would require immense storage capacity if not directly supplied by the umbilical from the remote installation. In both cases, a clutch is provided to disconnect the valve element in the event of a loss of power, thereby allowing the spring to move the valve into a fail-safe position. In this case, although it is no longer necessary for the spring to overcome hydraulic control fluid pressure being electric, a large spring is required to overcome the valve friction and the hydrostatic pressure. Furthermore, the clutch mechanism needed to disengage the valve element results in an unnecessarily costly and complicated structure.

The inventor has appreciated that the above problems can be overcome by the revolutionary new approach of operating the devices, not by a hydraulic actuator, with a fail safe return spring, but by means of a rotary actuator driven by an electric motor which is normally energised from an external source through an umbilical. The necessary fail safe condition is achieved by providing the motor with a local backup power source which, in the event of loss of primary power, is sufficient to drive the motor to return the device to a safe position.

SUMMARY OF THE INVENTION

In accordance with the present invention, therefore, an actuation module for actuating a device in a subsea wellhead assembly comprises a housing containing a rotatable actuator which is, or is arranged to be, coupled to a rotatable part of the device, whereby, in use, rotation of the part by the actuator causes an element of the device to move between operating positions; an electric motor for rotating the actuator; an input for receiving primary power and/or a control signal from an external source for energising and/or controlling the motor; an electrical storage unit for providing a back-up secondary power source; and a controller for responding to a loss of primary power and/or control signal and thence causing the motor to be energised if necessary from the electrical storage unit so that the motor causes the element to move to one of the operating positions representing, in use, a safe mode.

With this arrangement, the coupling, which only transmits rotary motion between the actuator and the part of the device, is unaffected by hydrostatic pressure and a spring is not required. Thus the electric power to operate the device is much reduced as all that is required is sufficient power to overcome the friction between the device element and housing seals. Further, because each actuator can be provided with its own self contained back-up power source, each device has individual fail-safe control.

Although the module may be a permanent fixture on the wellhead assembly, it may from time to time require replacement. For this reason the module is preferably arranged to be coupled to, and decoupled from, the wellhead assembly by, for example, a diver or ROV. In this case, the coupling between the rotatable actuator and the rotatable part of the device will be a torque-transmitting interface, such as a splined or keyed coupling, which can be engaged and disengaged by relative axial movement.

The backup secondary power source is most simply a battery. The primary power source, connected to the module through an umbilical, may be connected through the backup source to maintain this fully charged, any surplus power being available to energise the motor. This ensures that whenever there is a loss of primary power, the backup source will always be fully charged for operating the motor.

The controller could be a simple solenoid switch or, for more sophisticated applications, an intelligent programmed processor.

There may be more than one of the actuators and respective motor and backup secondary power source, for operating a respected number of wellhead assembly devices, in the same housing. This avoids the primary power umbilical having to have suitably sized core to carry the power for each actuator, which would make it very costly and bulky. By providing a local storage unit and a local processor for allocating power to the respective actuators, the umbilical can be reduced to a single power core and a signal line. The signal line will instruct the processor and controller as to which actuators are to be operated. The processor must then be capable of detecting either a loss of primary power or a loss of remote signal, and in either case cause the respective actuator to be operated to bring the respective device into a safe mode.

BRIEF DESCRIPTION OF THE DRAWINGS

Examples of valve actuation modules constructed in accordance with the present invention will now be described with reference to the accompanying drawings, in which.

DETAILED DESCRIPTIONS OF THE PREFERRED EMBODIMENT

Figure 1:
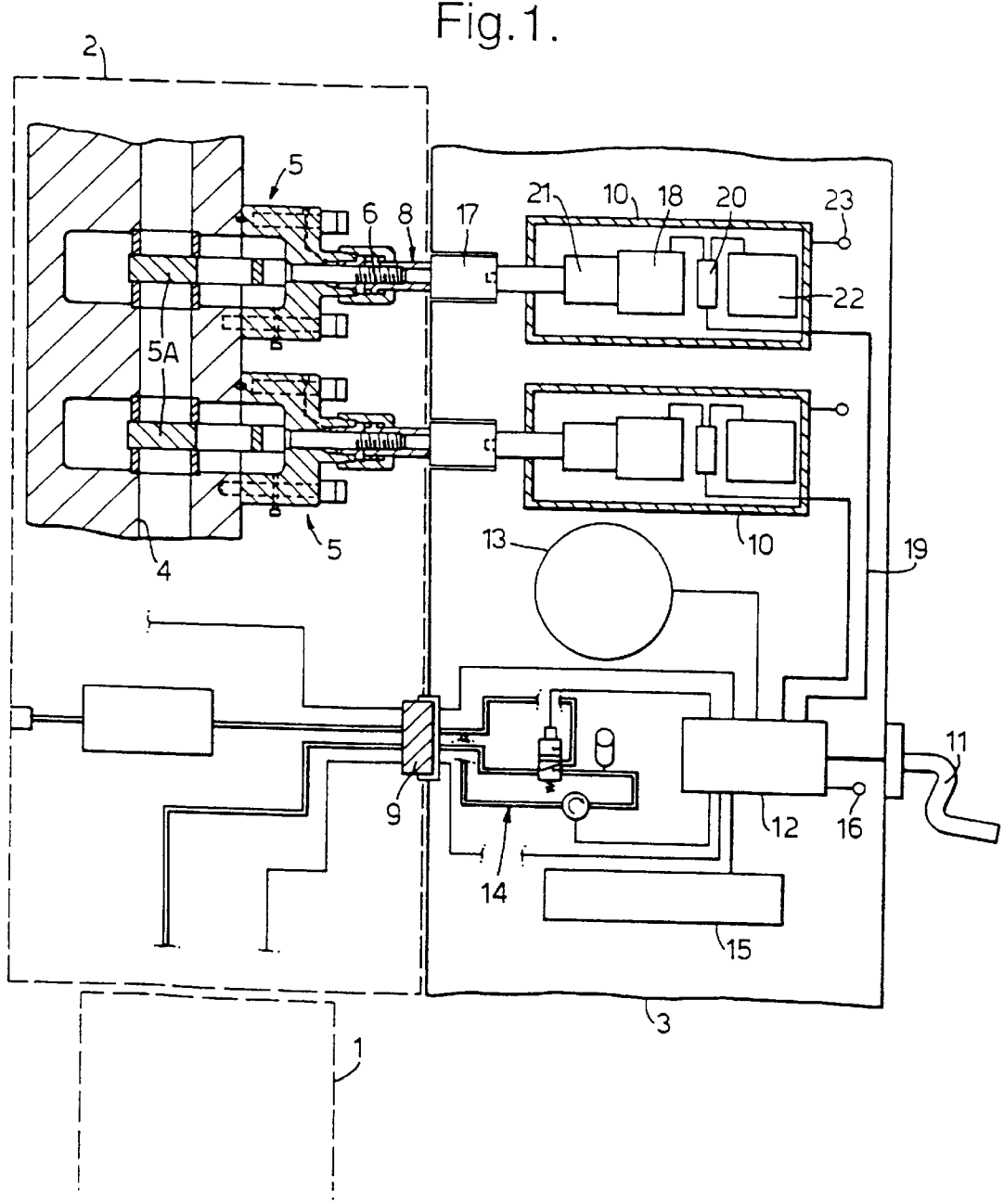
FIG. 1 is a schematic view, partly in vertical section, of a first module together with a subsea tree with gate valves and a wellhead.

It should be noted that although FIG. 1 is described in terms of a gate valve, the invention is applicable to any device where movement of an element can be achieved rotationally. Thus, the invention applies, for example, to ball valves and chokes or inserted flow assemblies that require external drive shaft operation without disturbing the drive shaft operating system. The invention is described on a tree although it is applicable on any assembly where flow control is required.

Figure 2:
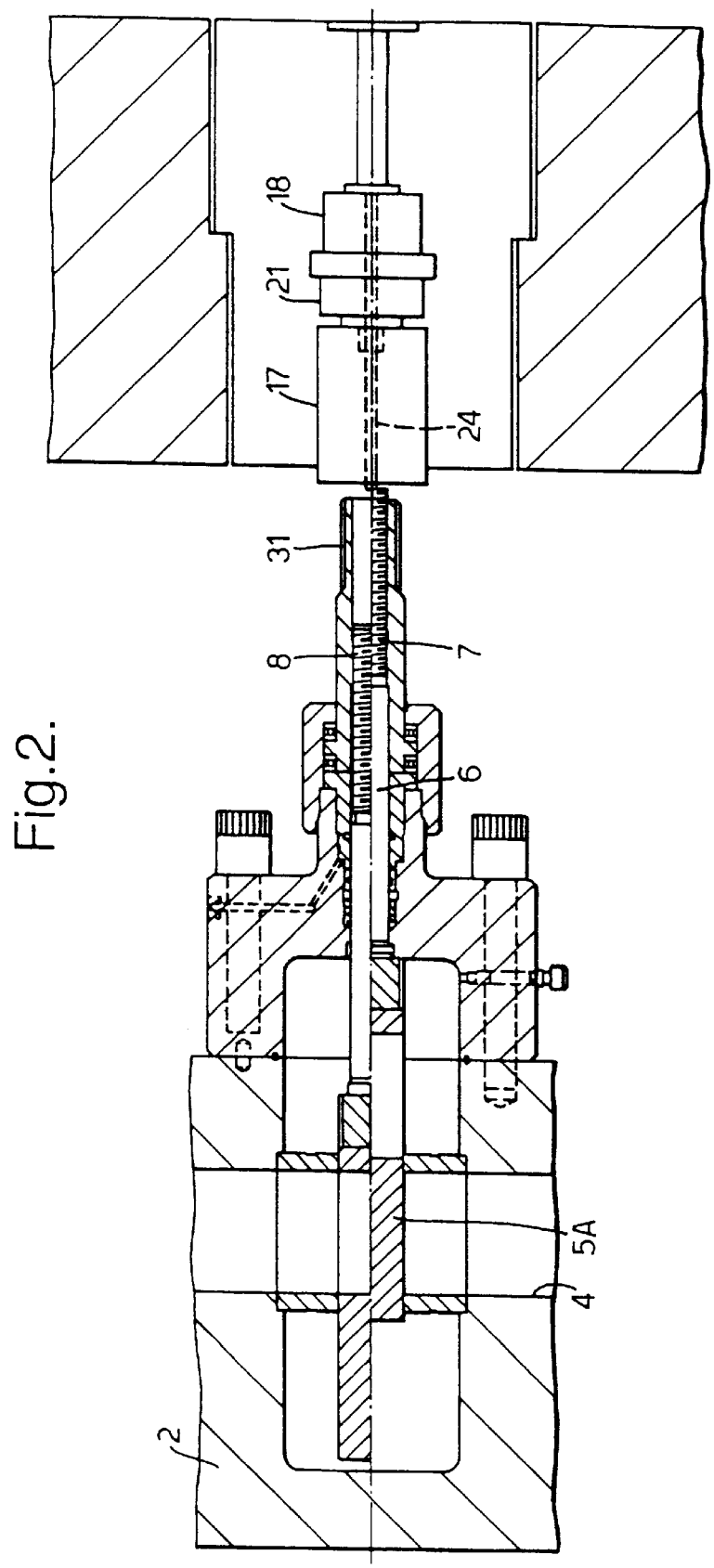
FIG. 2 is a more detailed view of part of FIG. 1, showing one of the gate valves split with one half in the fully open position and the other half in the fully closed position; and, FIG. 3 is a schematic view of a part of a module for the actuation of a ball valve element.

As shown in FIGS. 1 and 2, a wellhead 1 is provided with a valve tree 2 which may be a Christmas tree or a horizontal tree. The valve actuators and associated elements are provided in a separate valve actuation module 3 which is moved into place using subsea guidance, or using an ROV. Actuation Module 3 is landed and then transversely engaged in the appropriate position with respect to the tree 2. In this respect, the provision of a valve actuation module is similar to the system disclosed in U.S. Pat. No. 5,456,313, and reference is made to this document particularly with regard to the means for engaging the module with respect to the tree, and to the interface between the module and the tree.

Alternatively the valve tree 2 interface could be vertical or at an angle allowing the actuation module to be guided directly into position.

FIG. 2 shows in more detail a bore 4 in the subsea tree 2 is shown having two identical gate valves 5 with gate slab elements 5A. The gate valve elements 5A are moved in a linear direction by virtue of stems 6. The stems 6 are provided with a screw coupling 7 to an externally splined sleeve 8 rotary motion of which is thus converted into linear motion of the stems 6 and gate valve slabs 5A. The tree 2 is also provided with control and monitoring equipment for hydraulic and electrical signals via a junction plate 9.

FIG. 1 shows the valve actuation module 3 is shown with two actuation assemblies 10 one for each of the gate valves 5. Each actuation assembly is provided with power and signals from an external signal and power umbilical line 11. The power is transmitted via an overall systems controller 12, which controls other electrical actuators and functions 13, as well as providing hydraulic power via an hydraulic circuit 14 for various downhole applications, electrical sensors and tree sensors. The overall systems controller 12 is provided with its own back-up electrical storage unit 15 which can provide electrical power for the whole system in the event of a power loss through the main umbilical line 11 and is thus capable of operating the tree if there is a external power failure. The overall systems controller 12 is also provided with an acoustic receiver/transmitter 16 to allow for remote monitoring and control of the electrical systems in the event of a total umbilical line 11 failure.

Each of the actuation assemblies 10 is a sealed unit from which projects a splined socket 17 which, in use, engages with the spline on the sleeve 8. Inside each actuation assembly is a motor 18 which, under normal operation, is driven by power from the line 11 to which it is connected via power line 19 and a fail safe controller 20. The motor 18 drives the shaft of the splined socket 17 through a gearbox 21. Each actuation assembly has an electrical storage unit 22 connected to the fail safe controller 20.

To operate the tree, electrical signals and power are supplied from a remote installation. The electrical processor and controller 12 will assign power to the back up electrical storage unit 15 and to the actuator assemblies to charge up their electrical storage units 22. The fail-safe controller 20 will confirm when its electrical storage unit 22 is fully charged. The electrical processor and controller will verify that all fail safe controllers 20 have their electrical storage units 22 fully charged before actioning any signals from the remote installation.

To operate a valve, the electrical processor and controller 12 will send a signal to the fail-safe controller 20 while providing it with a power supply from umbilical line 11. This power supply can be augmented by power provided from the back up electrical storage unit 15 when several actuations operations are required simultaneously.

On receiving certain signals from the remote installation, the electrical processor and controller 12 can be programmed to operate certain control sequences on the tree. At all times, it will monitor the condition of the tree and in the actuation module, ensuring that there is sufficient power in the back-up electrical storage unit 15 to close two valves.

The fail-safe controller 20, on receiving an operating signal from the electrical processor and controller 12 will first ensure the electrical storage unit 22 is fully charged before using power from line 19 to open, close or to adjust the position of the stem. Only on a loss of signal in line 19, will a failure operation be actioned. The fail safe controller 20 when operating can provide data to the electrical processor and controller 12 on the stem position at all times, the torque, number of revolutions and the speed of operation. The electrical processor and controller 12 can access the data from the actuator assemblies and relay the full status of the tree to the surface installation.

The electrical processor and controller 12 will detect any loss of power or signal in the umbilical line 11. A loss of power can be implemented by backup electrical storage unit 15. A loss of signal in umbilical line 11 will initiate a pre-set programmed closure of the tree, first using power from umbilical 11 if available. For temporary control of the tree, the acoustic receiver/transmitter 16 can be used.

An interruption of the signal through line 19 is detected by the fail-safe controller 20 which will switch the valve firstly using power from line 19.

An interruption of the signal and primary power through the line 19 is detected by the fail safe controller 20 which secondly would switch in emergency electrical storage unit 22. The fail safe controller is programmed with a preset fail position of the gate valve 5 and controls the motor to drive the gate valve into this position. Each actuation assembly is provided with an acoustic receiver/transmitter 23 which allows full remote secondary monitoring of a position of each gate valve, and also allows remote control of the position of the gate valve if line 19 has failed.

The position of the gate valve slab is sensed by abutment of the end of the stem 6 with a sensor 24.

Figure 3:
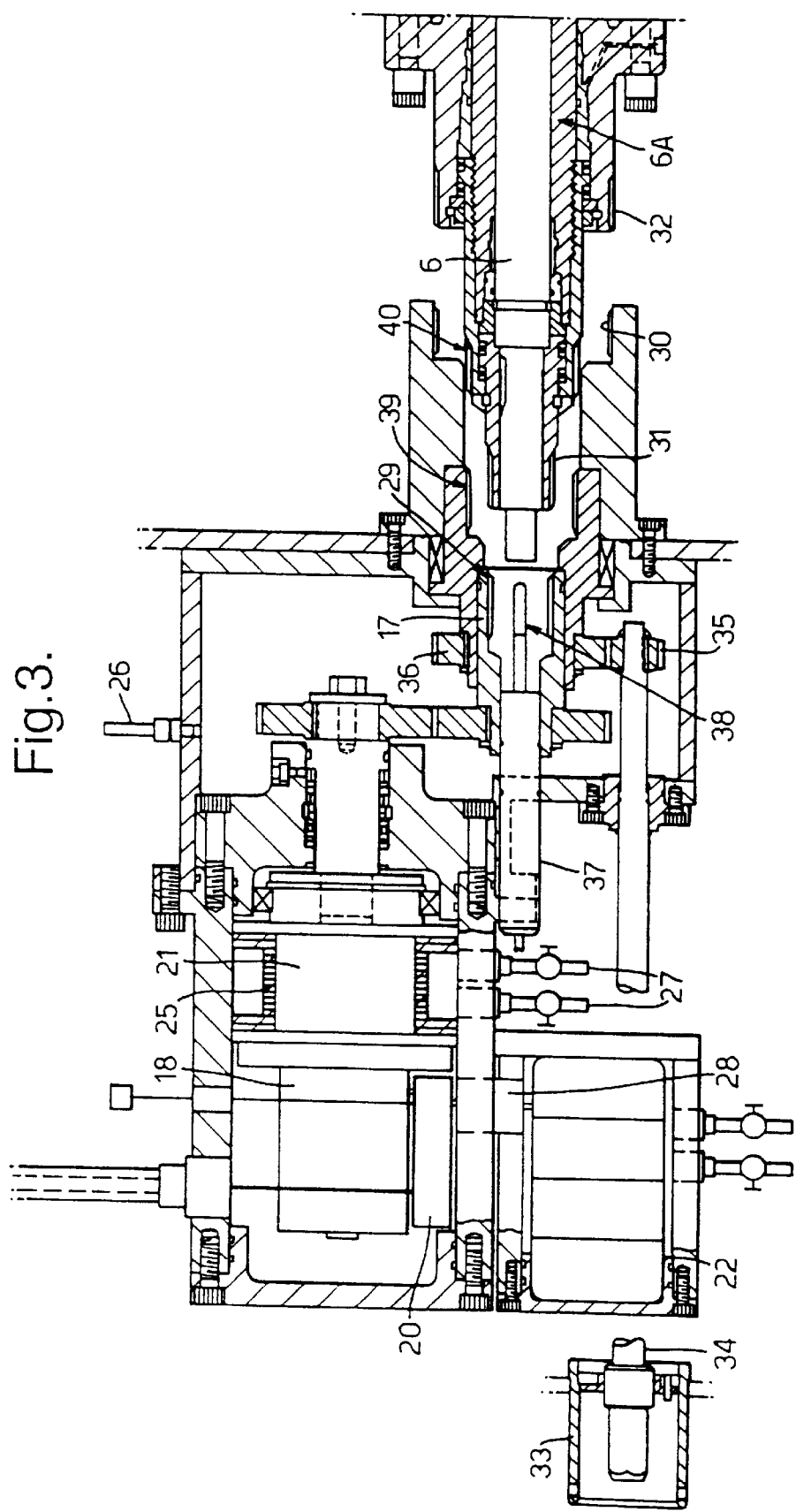

FIG. 3 provides a more detailed view of one actuation assembly and discloses the means of operating an inserted tree valve (i.e. ball valve) that requires the stem 6 to be partially withdrawn to facilitate the insertion or withdrawal of the ball valve. In this figure the same reference numerals are used to designate the same parts as in FIGS. 1 and 2. As shown in FIG. 3 a safety make-up overload clutch 25 is provided between the motor 18 and gearbox 21. Further, conventional features such as an oil line 26 to the gearbox and inert gas (i.e. nitrogen) purge and exhaust lines 27 to electrical storage unit and gearbox are provided. To reduce the length of the actuation assemblies, the electrical storage unit 22 can be positioned not on the same axis as the motor. The electrical storage unit 22 in its own independent housing is connected to the fail safe controller 20 by an electrical power penetrator 28. The splined socket 17 is provided on a rotatable portion with internal spline grooves 29 and internal anti-torque spine grooves 30 on a stationary portion. The end of the stem 6 of the ball valve has external spline grooves 31 which mate with the internal spline grooves 29. External anti-torque spline grooves 32 mate with the internal anti-torque spline grooves 30. It is also possible to provide the interengaging spline grooves with key portions to ensure that the positional relationship between the rotating spline mechanism and socket 17 is always known, thereby facilitating control of the position of the valve. Also shown in FIG. 3 is an optional ROV drive 33 provided with a driven shaft 34 which is shown broken in FIG. 3. The driven shaft 34 has a toothed gear 35 which mates with a tooth gear 36 that is directly connected to, and rotatable with, the socket 39 which interfaces with spline 40. This allows linear motion to stem sleeve 6A which contains the stem 6 and allows it to be engaged or disengaged from an internal assembly, (i.e. the ball of a ball valve) by a ROV. A linear position sensor 37 is provided with a position probe 38 which makes contact with the end of the stem 6. When used with a gate valve an accurate position of the gate slab 5A at any time is known. When used with a ball, ball position probe 38 will confirm whether stem 6 has been engaged or disengaged.

What is claimed is:

1. An actuation module for actuating a device in a subsea wellhead assembly, the device comprising an element movable between a first safe operating position and a second operating position, the module comprising:
   a housing containing a rotatable actuator arranged to be coupled to a rotatable part of the device, whereby when the actuator is coupled to the rotatable part of the device rotation of the rotatable part by the actuator causes the element of the device to move between the first and second operating positions;
   an electric motor for rotating the actuator;
   an input for receiving primary power from an external source for energizing the motor;
   a back-up secondary power source; and
   a controller for responding to a loss of primary power and thence, when the actuator is coupled to the rotatable part of the device, causing the motor to be energized from the back-up secondary power source if the element is in the second operating position so that the motor causes the element to move to the first operating position;
   wherein the primary power source is connected through the back-up secondary power source to maintain the back-up secondary power source fully charged, any surplus power being available to energize the motor.

2. A module according to claim 1, which is arranged to be coupled to, and decoupled from, the wellhead assembly.

3. A module according to claim 2, wherein the coupling between the rotatable actuator and the rotatable part of the device is a torque-transmitting interface.

4. A module according to claim 3, wherein the torque-transmitting interface is selected from the group consisting of a splined coupling and a keyed coupling which can be engaged and disengaged by relative axial movement.

5. A module according to claim 1, wherein the backup secondary power source is an electrical storage unit.

6. A module according to claim 1, wherein the controller is an intelligent programmed processor.

7. An actuation module for actuating a device in a subsea wellhead assembly, the device comprising an element movable between a first safe operating position and a second operating position, the module comprising:
   a housing containing a rotatable actuator arranged to be coupled to a rotatable part of the device, whereby when the actuator is coupled to the rotatable part of the device rotation of the rotatable part by the actuator causes the element of the device to move between the first and second operating positions;
   an electric motor for rotating the actuator;
   an input for receiving a control signal from an external source for controlling the motor;
   a back-up secondary power source; and
   a controller for responding to a loss of the control signal and thence, when the actuator is coupled to the rotatable part of the device, causing the motor to be energized from the back-up secondary power source if the element is in the second operating position so that the motor causes the element to move to the first operating position;
   wherein the primary power source is connected through the back-up secondary power source to maintain the back-up secondary power source fully charged, any surplus power being available to energize the motor.

* * * * *